US006029341A

United States Patent [19]

Self, Jr.

[11] Patent Number: 6,029,341

[45] Date of Patent: Feb. 29, 2000

[54] LATCH TOOL FOR ELECTRICAL CONNECTOR

[75] Inventor: Daines Milfred Self, Jr., Oak Ridge, N.C.

[73] Assignee: The Whitaker Corporation, Wilmington, Del.

[21] Appl. No.: 08/880,344

[22] Filed: Jun. 23, 1997

[51] Int. Cl.[7] .............................. B23P 19/00; B23P 19/04

[52] U.S. Cl. ................................ 29/747; 29/758; 29/253; 81/488

[58] Field of Search ............................ 29/747, 758, 764, 29/253, 729, 759; 81/488; 7/107

[56] References Cited

U.S. PATENT DOCUMENTS

| | | | |
|---|---|---|---|
| 900,741 | 10/1908 | Kerr | 81/3 R |
| 3,406,412 | 10/1968 | Kottas | 7/17 |
| 3,909,936 | 10/1975 | Ray | 29/629 |
| 3,947,904 | 4/1976 | Hayes | 7/3 A |
| 4,433,463 | 2/1984 | DuVal | 29/239 |
| 4,852,925 | 8/1989 | Lodin | 294/2 |
| 4,872,231 | 10/1989 | Gustasven | 7/103 |
| 5,090,920 | 2/1992 | Casey | 439/540 |
| 5,265,326 | 11/1993 | Scribner | 29/758 |
| 5,500,966 | 3/1996 | Wheat | 7/169 |
| 5,659,948 | 8/1997 | Vanderhoof et al. | 29/749 |

*Primary Examiner*—Lee Young
*Assistant Examiner*—Bobby Rushing, Jr.
*Attorney, Agent, or Firm*—R. J. Kapalka

[57] ABSTRACT

A tool to facilitate latching of an electrical connector to a mating electrical connector comprises a main shaft and a tool head extending at an angle from the main shaft. The tool head includes a wedge which is insertable between a housing and a latch arm of the electrical connector, wherein the wedge can be urged forwardly to facilitate the latching of the electrical connector to the mating electrical connector.

5 Claims, 2 Drawing Sheets

LATCH TOOL FOR ELECTRICAL CONNECTOR

FIELD OF THE INVENTION

The invention relates to a tool which is adapted for use with an electrical connector to facilitate latching attachment of the electrical connector to a mating electrical connector.

BACKGROUND OF THE INVENTION

An electrical connector which is sold under the trademark Universal MATE-N-LOK® by AMP Incorporated of Harrisburg, Pa. comprises a plug connector having pivotable latches which are engageable behind latch tabs on a mating cap connector to provide an electrical connector assembly. Recently a sealed version of the Universal MATE-N-LOK® connector has been developed and is disclosed in U.S. patent application Ser. No. 08/733,059. This sealed connector utilizes an interfacial seal which is disposed between the plug and cap connector housings, along with wire seals which are installed on rear ends of the plug and cap housings to seal around wires extending from the housings. The interfacial seal must be compressed between mating faces of the plug and cap housings to provide an effective seal therebetween. However, compressing the seal sufficiently so that the connectors can be latched together requires a significant force and is extremely difficult to do by hand, especially for manufacturing personnel who may be required to latch these connectors together repeatedly. There is a need to ease the effort required for latching together of mating electrical connectors.

SUMMARY OF THE INVENTION

The invention is a tool which is adapted to facilitate latching of an electrical connector to a mating electrical connector, wherein the electrical connector includes a housing and a latch arm, and the latch arm has a forward latching section, a rearward section, and an intermediate section which is pivotally connected to the housing. The tool comprises a main shaft and a tool head extending at an angle from the main shaft. The tool head includes a wedge which is insertable between the housing and the rearward section of the latch arm, wherein the wedge can be urged forwardly to facilitate the latching of the electrical connector to the mating electrical connector.

BRIEF DESCRIPTION OF THE DRAWINGS

The invention will now be described by way of example with reference to the accompanying drawings wherein.

DETAILED DESCRIPTION OF A PREFERRED EMBODIMENT

Figure 1:
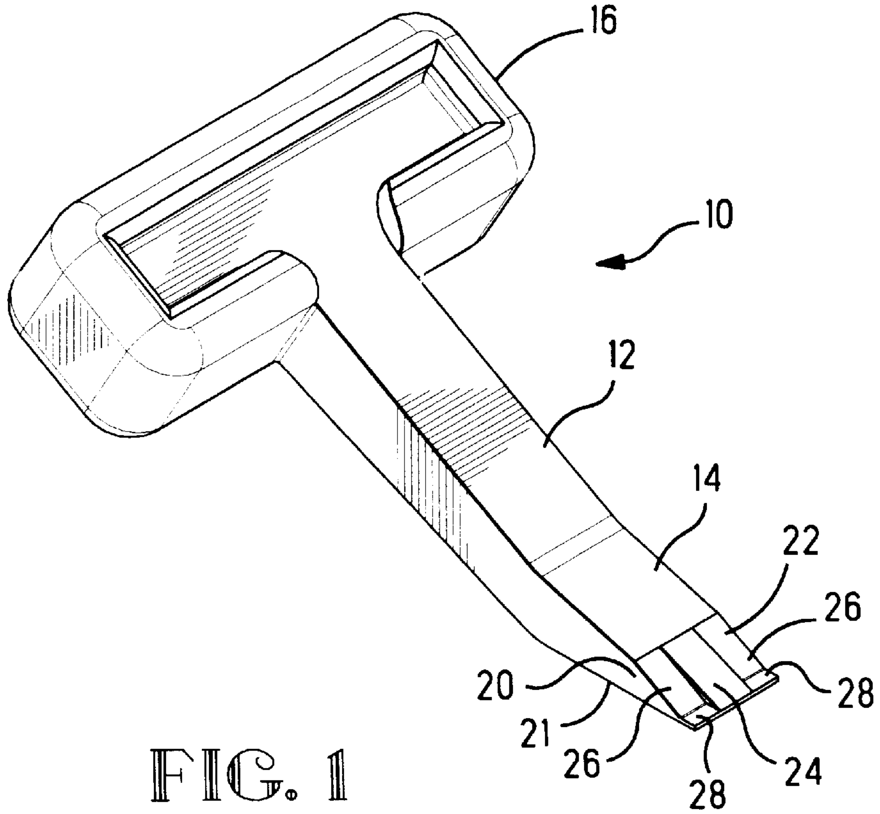
FIG. 1 is an isometric view of a latch tool according to the invention.
Figure 2:
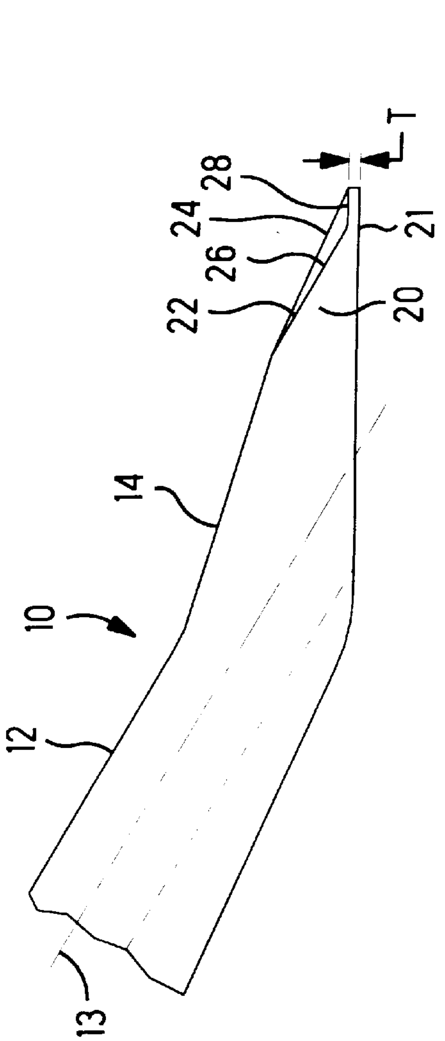
FIG. 2 is an enlarged side view of a leading end of the latch tool.

As shown in FIGS. 1 and 2, a latch tool 10 comprises an axially elongated main shaft 12 having a tool head 14 at one end and a handle 16 at an opposite end. The tool head 14 extends at an angle from an elongation axis 13 of the main shaft 12, and the handle 16 extends perpendicular to the main shaft 12. The tool head 14 includes a wedge portion 20 which has a lower surface 21 and an upper surface 22. The upper surface 22 includes ramps 26 and flat surfaces 28. The ramps 26 are inclined with respect to the lower surface 21. In the illustrated embodiment the upper surface 22 is split by a raised portion 24 which divides the upper surface into a pair of laterally spaced-apart ramps 26 which are coplanar. The ramps 26 descend toward the lower surface 21 until they merge with the flat surfaces 28 at a leading end of the tool head 14. The flat surfaces 28, which are coplanar, are parallel to the lower surface 21 which extends beyond the wedge portion 22 and beneath the flat surfaces 28 at the leading end of the tool head 14.

Figure 3:
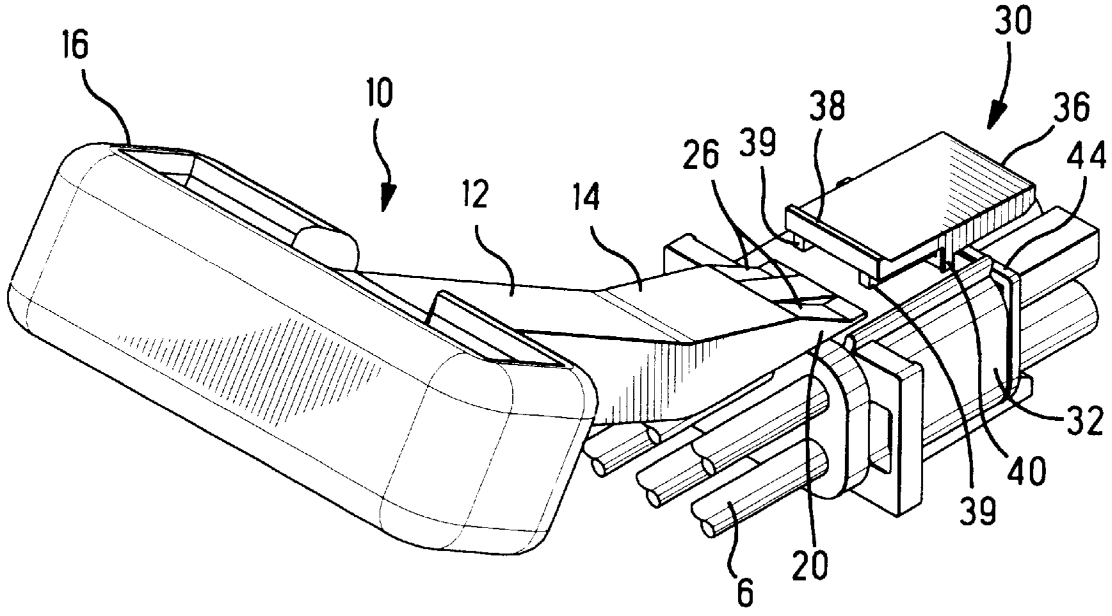
FIG. 3 is an isometric view of the tool being applied to an electrical connector.
Figure 4:
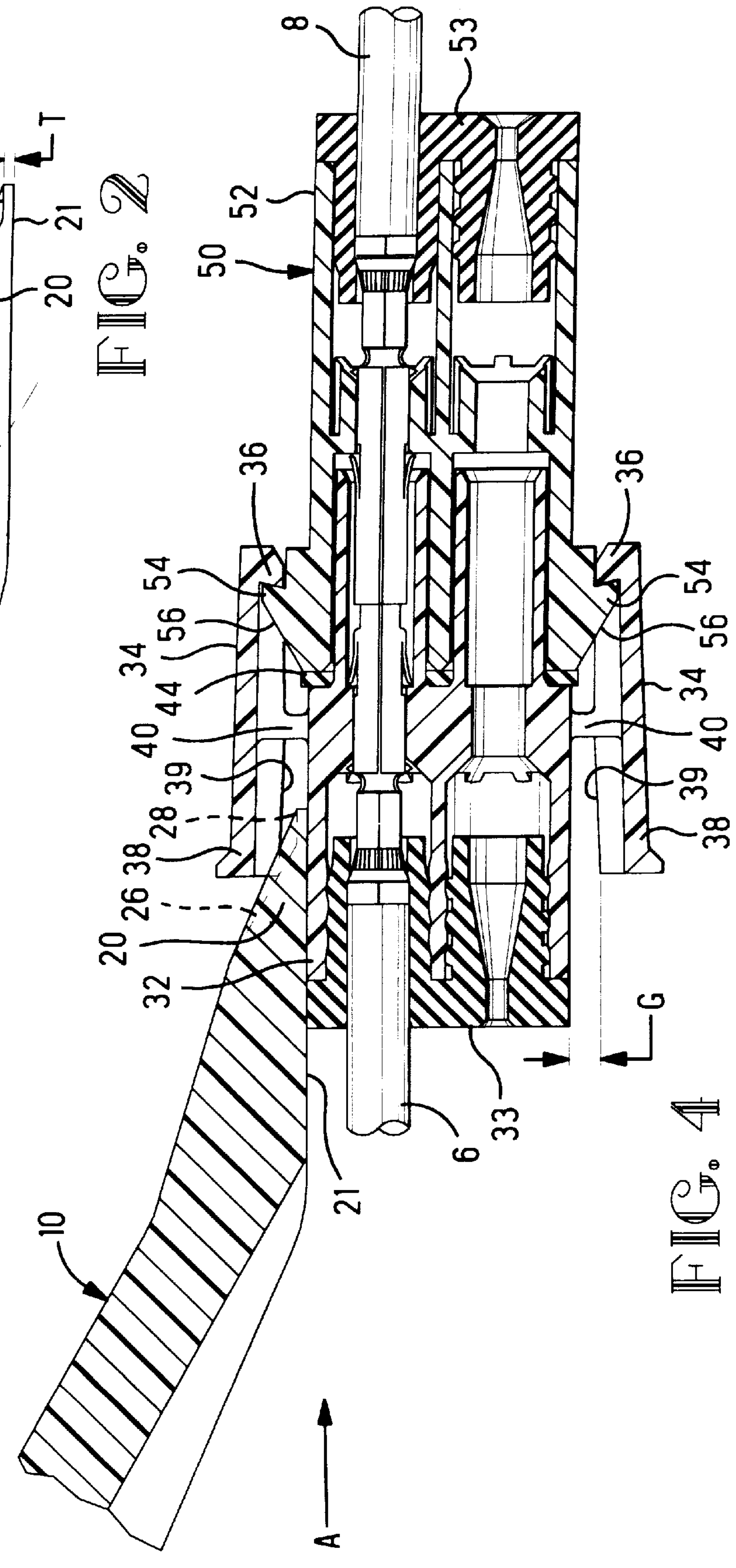
FIG. 4 is a side cross-sectional view of the tool being applied to latch the electrical connector to a mating electrical connector.

Application of the tool to an electrical connector 30 is shown in FIGS. 3 and 4. The electrical connector 30 is of a type including a housing 32 and a pair of latch arms 34. Each of the latch arms has a forward latching section 36, a rearward section 38, and an intermediate section 40 which is pivotally connected to the housing 32. The forward latching section 36 is latchable behind a corresponding latch tab 54 of a mating electrical connector 50. In the illustrated embodiment the rearward section 38 has a pair of laterally spaced-apart strengthening ribs 39. As shown in FIG. 3, the ramps 26 of the tool 10 are laterally spaced-apart by a distance corresponding to the spaced-apart distance of the ribs 39 so that the ramps 26 are engageable with the ribs 39. As shown in FIG. 4, the ribs 39 are spaced at a gap G from the connector housing 32. A leading end of the tool has a thickness T (shown in FIG. 2) between the flat surfaces 28 and the lower surface 21 that is less than the gap G.

Each of the connectors 30 and 50 may have a respective wire seal 33, 53 disposed on a rear face of its respective housing 32, 52 through which wire conductors 6, 8 can be installed. Further, an interfacial seal 44 may be installed on the connector 30 for sealing between abutting front faces of the connector housings 32, 52. The interfacial seal 44 must be compressed in order to latch the connectors together, and normally a significant force must be applied to compress the seal and latch the connectors. Use of the tool 10 significantly eases the latching procedure. The tool is applied to the connector 30 by inserting the leading end of the tool between the connector housing 32 and the rearward section 38 of one of the latch arms 34 so that the ramps 26 engage the ribs 39. Urging the tool in the direction of arrow A forces the wedge portion 20 between the latch arm 34 and the connector housing 32, thereby causing the forward latching section 36 to be deflected by ramp 56 of its corresponding latch tab 54 until the forward latching section passes beyond the latch tab and can resile behind it. The tool is then applied to the other latch arm 34 in a similar manner, whereby the connectors 30 and 50 become fully latched together.

The invention having been disclosed, a number of variations will now become apparent to those skilled in the art. Whereas the invention is intended to encompass the foregoing preferred embodiments as well as a reasonable range of equivalents, reference should be made to the appended claims rather than the foregoing discussion of examples, in order to assess the scope of the invention in which exclusive rights are claimed.

I claim:

1. An electrical connector latching system comprising:

an electrical connector including a housing and a latch arm, the latch arm having a forward latching section, a rearward section, and an intermediate section which is pivotally connected to the housing, the forward latching section being cooperable with a latch tab of a mating electrical connector for latching the electrical connector to the mating electrical connector; and a tool having a main shaft and a tool head extending at an angle from the main shaft, the tool head including a wedge which is configured for insertion between the housing and the rearward section of the latch arm, wherein inserting the wedge between the housing and the rearward section and urging the wedge forwardly facilitates the latching of the electrical connector to the mating electrical connector.

2. The electrical connector latching system according to claim 1, wherein the wedge has an upper surface which defines a pair of laterally spaced-apart ramps.

3. The electrical connector latching system according to claim 2, wherein the pair of ramps are coplanar.

4. The electrical connector latching system according to claim 1, wherein a leading end of the tool head has upper and lower surfaces that are mutually parallel.

5. The electrical connector latching system according to claim 1, further comprising a handle extending perpendicular to the main shaft.

* * * * *